United States Patent Office 2,755,286
Patented July 17, 1956

2,755,286

PROCESS OF PREPARING OXAZOLIDONES

John Barr Bell, Jr., Little Silver, N. J., and John David Malkemus, Austin, Tex., assignors to Jefferson Chemical Company, Inc., New York, N. Y., a corporation of Delaware No Drawing. Application April 15, 1954,
Serial No. 423,534

6 Claims. (Cl. 260—307)

This invention relates to the production of oxazolidones.

The preparation of 2-oxazolidones from difficultly accessible N-carbalkoxy 2-haloalkylamines or by reaction of 2-amino alcohols with dialkyl carbonates in the presence of alkaline catalysts has been suggested.

It is among the objects of the present invention to provide a process for producing 2-oxazolidones which can be carried out more economically than prior known procedures, particularly in that it involves the use of less expensive reactants, and which permits of better control over the reactions.

Other objects and advantages of this invention will be apparent from the following detailed description thereof.

In accordance with this invention, 2-oxazolidones are prepared by heating N-(2-hydroxyalkyl) 2-hydroxyalkyl carbamates at a temperature of about 85° to about 190° C., preferably at a temperature within the range of 100°–160° C. When so heated an intramolecular transesterification takes place and the desired oxazolidone is produced. Preferably, the glycol simultaneously formed with the oxazolidone is distilled from the reaction mixture during the reaction and this is effected at pressures below 100 mm. of mercury, preferably below about 20 mm. of mercury. In this way the reaction is caused to go to completion and catalysts need not be added, although, as hereinafter more fully discussed, they can be used, if desired, to hasten the reaction.

The N-(2-hydroxyalkyl) 2-hydroxyalkyl carbamates can be prepared by any known method. Preferably they are prepared by reacting a 2-hydroxy-alkylamine, such as monoethanolamine, diethanolamine, N-methyl monoethanolamine, N-ethyl-ethanolamine, isopropanolamine, or N-methyl isopropanolamine with an alkylene carbonate, such as ethylene carbonate, propylene carbonate, 1,2-butylene carbonate or 2,3 butylene carbonate. These reactants, it will be noted, are readily available and the alkylene carbonates are much less expensive than the dialkyl carbonates. The production of the N-(2-hydroxyalkyl) 2-hydroxyalkyl carbamate may be represented by the following equation:

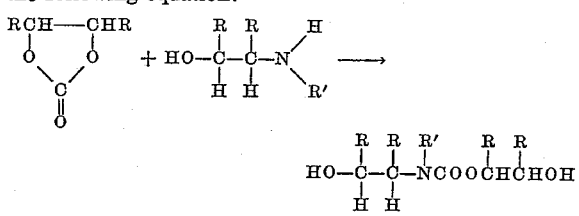

in which R is hydrogen or alkyl, preferably methyl or ethyl, and R' is hydrogen, alkyl containing from 1 to 20 carbon atoms or hydroxyalkyl containing from 2 to 8 carbon atoms.

The transesterification may be represented by the following equation:

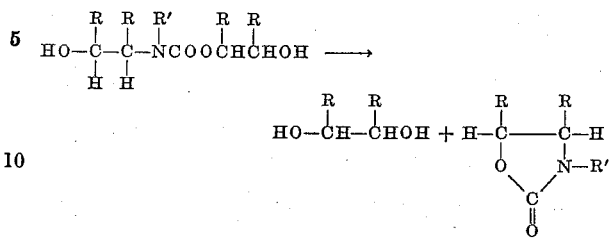

in which R and R' have the values above noted.

Catalysts may be employed to hasten the tranesterification; however, they are not necessary and in some cases may even be objectionable in that they tend to promote undesired side reactions. Examples of catalysts which may be used are alkaline catalysts, such as sodium, sodium hydroxide, sodium carbonate, potassium carbonate, calcium hydroxide, and alkali metal alcoholates, metal salts, such as ferric chloride, and metal oxides, such as ferric oxide and litharge.

The transesterification reaction may be carried out in the presence of toluene, o-, m-, or p-xylene, ethyl benzene, anisole, phenetole, mesitylene, cumene, pseudocumene, propyl benzene, di-n-butyl ether or di-isobutyl ether. These compounds function not only as solvents or diluents for the reactants and reaction products but primarily as agents with which the glycol produced in the course of the transesterification is azeotroped away from the reaction mixture. Of the above noted agents, the alkylated benzenes containing a total of 7 to 9 carbon atoms are preferred.

The present invention may be carried out in two steps involving as the first step the production and isolation of the N-(2-hydroxyalkyl) 2-hydroxyalkyl carbamate and as the second step the transesterification of the isolated intermediate. Alternatively, the reaction mixture from step 1 may be heated, desirably under vacuum, without isolating the intermediate. Furthermore, the reactants need not be in the anhydrous state, as in the case of the reaction of dialkyl carbonates with 2-amino alcohols. Aqueous 2-amino alcohols will react readily with vicinal alkylene carbonates to give aqueous N-(2-hydroxyalkyl) 2-hydroxyalkyl carbamates. The water contained in this product can be conveniently removed by vacuum distillation during the early stages of the heating of the reaction mixture to convert the carbamate into an oxazolidone.

The following examples of the invention are given for purposes of illustration only. It will be understood the invention is not limited to these examples:

Example I 200 grams (1.34 mols) of N-(2-hydroxyethyl)-2-hydroxyethyl carbamate are distilled for one hour at a still pot temperature of 130°–164° C. under pressure of 3 mm. of mercury and while returning a portion of the condensate as reflux liquid. 190 grams of overhead product are collected at a still head temperature of 79°–148° C. This 190 grams of overhead product is returned to the distillation pot which contains 9 grams of residue and the mixture redistilled over a period of one hour. 197 grams of overhead product are obtained at a still pot temperature of 70°–165° C., a still head temperature of 62°–150° C. and under a pressure of 1 mm. of mercury. The 197 grams of overhead product are cooled to 0° C. and 126 grams of crude crystallized 2-oxazolidone removed by filtration. This crude product is crystallized from 100 grams of chloroform; 69 grams of 2-oxazolidone (melting point 87°–88° C.) are recovered as a first crop and 27 grams as a second crop after concentrating the mother liquor. The total yield is thus 82.2% of theoretical.

Example II

A mixture of 447 grams (3.0 mols) of N-(2-hydroxyethyl 2-hydroxyethyl carbamate and 2.25 grams of potassium carbonate catalyst are heated at 98°–110° C. still pot temperature under a pressure of 1.5 to 3.5 mm. of mercury. 163 grams of overhead product, largely glycol, are removed during 2½ hours of distillation at a still head temperature of 74.5°–80° C. and while returning a portion of the condensate as reflux liquid. The residue weighs 281 grams and crystallizes to a white solid having a freezing point of 60° C. This residue is crystallized from chloroform producing 171.5 grams of 2-oxazolidone having a melting point of from 77° to 87° C. The yield is 65.7% of theoretical.

Example III

A mixture of 298 grams (2.0 mols) of N-(2-hydroxyethyl) 2-hydroxyethyl carbamate and 200 grams of toluene are heated at atmosphere pressure at 111°–120° C. still pot temperature for 112 hours. The toluene and ethylene glycol thus distilled over are separated in a trap, the upper toluene layer returned as reflux liquid and the lower layer of ethylene glycol collected in the trap. A total of 93.5 grams of ethylene glycol is thus collected. Distillation is then continued to effect removal of toluene at atmospheric pressure. The residue is distilled under reduced pressure of 1 to 2 mm. of mercury and 106.2 grams of 2-oxazolidone having a melting point of 70°–80° C. taken off overhead. The yield is 61% of theoretical.

Substitution of other agents, such for example as ethyl benzene, propyl benzene or xylene for the toluene in the above example effects a more rapid removal of the ethylene glycol than is effected by the use of the toluene.

Example IV 200 grams (1.035 mols) of N,N-bis (2-hydroxyethyl) 2-hydroxyethyl carbamate are heated at a still pot temperature of 91°–182° C. and a still head temperature of 64°–155° C. under a pressure of 1.2 mm. of mercury. During this distillation a portion of the overhead condensate is returned as reflux liquid. 195 grams of overhead product is thus produced; this overhead product is a mixture of ethylene glycol and N-(2-hydroxyethyl) 2-oxazolidone. The overhead product is redistilled at 1 mm. of mercury pressure and fractionated to produce a fraction consisting chiefly of ethylene glycol and two other fractions which are taken off at still pot temperature of 164°–166° C. and 166° C., respectively, and still head temperature of 160°–164.5° C. and 164.5°–165° C. respectively and which consist chiefly of N-(2-hydroxyethyl) 2-oxazolidone. These two fractions have refractive indices ($n_D^{20}$) of 1.4822 and 1.4828, respectively. Their densities ($d_4^{20}$) are 1.2686 and they have an OH number of 434. By the OH number is meant the number of milligrams of potassium hydroxide required to saponify the acetates formed from 1 gram of the compound. The yield of N-(2-hydroxyethyl) 2-oxazolidone is 85.5% of theoretical.

Example V 1930 grams (10 mols) of N,N-bis (2-hydroxyethyl) 2-hydroxyethyl carbamate are heated in a column still. The initial fractions taken off at a still pot temperature of 100–167° C., a head temperature of 60°–161° C., and a pressure of 1 mm. of mercury consist chiefly of ethylene glycol. A succeeding fraction taken off overhead at a still pot temperature of 167°–178° C., a still head temperature of 161°–173° C., and a pressure of 1 mm. of mercury is chiefly N-(2-hydroxyethyl) 2-oxazolidone. It has a refractive index ($n_D^{20}$) of 1.4808. Another fraction taken off overhead at a still pot temperature of 175°–188° C., a still head temperature of 170°–176° C. and a pressure of 1–3 mm. of mercury has a refractive index ($n_D^{20}$) of 1.4830. These two fractions are combined and amount to 1135 parts of product, corresponding to an 86.6% of theoretical yield of N-(2-hydroxyethyl) 2-oxazolidone. This product has a density ($d_4^{20}$) of 1.2673 and an OH number of 438.

Example VI 282 grams (1.73 mols) of N-methyl N-(2-hydroxyethyl) 2-hydroxyethyl carbamate are distilled at a still pot temperature of 87°–98° C., a head temperature of 61°–78° C. under a pressure of 1 mm. of mercury. 270.5 grams of overhead product are thus obtained; the product consists of a mixture of ethylene glycol and N-methyl-2-oxazolidone. This overhead product is fractionated in a packed column. A forerun of 111 grams is taken off overhead at a still pot temperature of 95°–127° C. and a head temperature of 58°–80° C. under a pressure of 1 mm. of mercury. This forerun is largely ethylene glycol. Continued distillation at a still pot temperature of 127°–150° C. and a head temperature of 87°–90° C. under a pressure of 1 mm. of mercury produces 127 grams of N-methyl-2-oxazolidone. This corresponds to a yield of 72.8%. The N-methyl-2-oxazolidone thus produced is a colorless water-soluble liquid having a freezing point of 15° C., a refractive index ($n_D^{20}$) of 1.4528, a density ($d_4^{20}$) of 1.1697.

Additional N-methyl-2-oxazolidone having a freezing point of 13.5° C., a refractive index ($n_D^{20}$) of 1.4528 is recovered by continued distillation of the residue without a column. 17 grams, equivalent to 9.7% yield is thus obtained. Hence, the total yield is 82.5% of theoretical.

Example VII 489 grams (3 mols) of N-(2-hydroxyethyl) 2-hydroxypropyl carbamate are heated at a still pot temperature of 112°–157° C., a head temperature of 102°–217° C. under a pressure of 1 mm. of mercury. 479 grams of overhead product are obtained; this product is a mixture of propylene glycol and 2-oxazolidone. It is fractionated in a packed column. There is thus obtained 218 grams of propylene glycol during the distillation at a pot temperature of 97°–159° C. and a head temperature of 47°–63° C. under a pressure of 1 mm. of mercury. 244 grams of residue which crystallize to a white solid having a freezing point of 77° C. is obtained; this solid is chiefly 2-oxazolidone. This corresponds to a yield of 93.5% of theoretical.

Example VIII 1029 grams of N-(2-hydroxypropyl) 2-hydroxyethyl carbamate are fractionated at a still head temperature of 50°–78° C. under a pressure of 1 mm. of mercury. An initial fraction of 365 grams is obtained consisting chiefly of ethylene glycol. Thereafter there is obtained a small fraction consisting of 31 grams which boiled up to 111° C. at about 1 mm. of mercury pressure and finally 601 grams of 5-methyl-2-oxazolidone boiling at 111°–113° C. under 1 mm. of mercury pressure. The product has a refractive index ($n_D^{20}$) of 1.4592, a density of ($d_4^{20}$) of 1.180. The yield is 93% of theoretical.

Thus, it will be noted, the invention provides a process for producing 2-oxazolidones which can be carried out more economically than prior known procedures in that it involves the use of less expensive reactants.

It is further to be understood that this invention is not restricted to the present disclosure otherwise than as defined by the appended claims.

What we claim is:

1. A process for preparing 2-oxazolidone which comprises heating N-(2-hydroxyethyl) 2-hydroxyethyl carbamate with refluxing at a temperature between about 85–190° C. and a pressure below about 20 mm. of mercury for at least two hours and until transesterification has been effected to produce a mixture of 2-oxazolidone and ethylene glycol, and separating said ethylene glycol to produce 2-oxazolidone.

2. A process according to claim 1 wherein said carbamate is heated in the absence of a catalyst to produce 2-oxazolidone in at least 82% yield.

3. A process for preparing 2-oxazolidones which comprises heating N-(2-hydroxyalkyl) 2-hydroxyalkyl carbamate in the absence of a catalyst with refluxing at a temperature between about 85 to 190° C. for at least two hours and until transesterification has been effected to produce a mixture of a 2-oxazolidone and a glycol, and separating said glycol to produce a 2-oxazolidone.

4. A process according to claim 3 wherein the separation of said glycol from said 2-oxazolidone is effected by heating said mixture in the presence of an azeotrope-forming hydrocarbon solvent.

5. A process for preparing 2-oxazolidones which comprises reacting one mole of a beta hydroxy alkanolamine with one mole of an alkylene carbonate to produce substantially one mole of 2-hydroxyalkyl N-(2-hydroxyalkyl) carbamate, and heating said carbamate in the absence of a catalyst with refluxing at a temperature between about 85 to 190° C. for at least two hours and until transesterification has been effected to produce a 2-oxazolidone and a glycol and effecting the separation of said glycol formed during the reaction by conducting such heating in the presence of an azeotrope-forming hydrocarbon solvent.

6. A process according to claim 5 wherein said carbamate is separated from reaction products prior to said heating step.

References Cited in the file of this patent

UNITED STATES PATENTS

| | | |
|---|---|---|
| 2,399,118 | Homeyer | Apr. 23, 1946 |
| 2,437,388 | Homeyer | Mar. 9, 1948 |
| 2,437,389 | Homeyer | Mar. 9, 1948 |
| 2,437,390 | Homeyer | Mar. 9, 1948 |
| 2,441,298 | Strain | May 11, 1948 |
| 2,652,402 | Gever | Sept. 15, 1953 |

OTHER REFERENCES

Paquin: Chem. Abst., vol. 42, col. 124 (1948).
Katchalski et al.: Chem. Abst., vol. 45, col. 2932 (1951).